(12) United States Patent
Watanabe et al.

(10) Patent No.: US 11,115,238 B2
(45) Date of Patent: Sep. 7, 2021

(54) GATEWAY DEVICE

(71) Applicant: Hitachi Automotive Systems, Ltd., Hitachinaka (JP)

(72) Inventors: Kazuhiro Watanabe, Hitachinaka (JP); Masashi Saito, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/652,114

(22) PCT Filed: Sep. 5, 2018

(86) PCT No.: PCT/JP2018/032808
§ 371 (c)(1),
(2) Date: Mar. 30, 2020

(87) PCT Pub. No.: WO2019/073721
PCT Pub. Date: Apr. 18, 2019

(65) Prior Publication Data
US 2020/0313928 A1 Oct. 1, 2020

(30) Foreign Application Priority Data
Oct. 10, 2017 (JP) .............................. JP2017-196854

(51) Int. Cl.
*H04L 12/46* (2006.01)
*H04L 12/66* (2006.01)
(Continued)

(52) U.S. Cl.
CPC .............. *H04L 12/46* (2013.01); *H04L 12/66* (2013.01); *H04W 52/0235* (2013.01);
(Continued)

(58) Field of Classification Search
None
See application file for complete search history.

(56) References Cited

U.S. PATENT DOCUMENTS 7,701,954 B2     4/2010   Rabenko et al.
2002/0021686 A1*   2/2002   Ozluturk .............. H04B 1/7075
                                                             370/342
(Continued)

FOREIGN PATENT DOCUMENTS

JP     2005-86692 A    3/2005
JP     2008-158772 A    7/2008
(Continued)

OTHER PUBLICATIONS

International Search Report with English translation and Written Opinion issued in corresponding application No. PCT/JP2018/032808 dated Dec. 18, 2018.
(Continued)

*Primary Examiner* — Peter Chen
*Assistant Examiner* — Jeff Banthrongsack
(74) *Attorney, Agent, or Firm* — Foley & Lardner LLP

(57) ABSTRACT

Provided is a gateway device capable of reducing power consumption in a sleep state and relaying an activation signal between networks without delay. When receiving an activation signal, the gateway device according to the present invention transfers the activation signal to another network via a relay switch, and outputs a signal indicating the reception of the activation signal from a transceiver, thereby turning on a microcomputer.

6 Claims, 7 Drawing Sheets

(51) Int. Cl.
*H04W 52/02* (2009.01)
*H04W 88/04* (2009.01)
*H04W 88/16* (2009.01)
*H04W 88/18* (2009.01)

(52) U.S. Cl.
CPC ....... *H04W 52/0274* (2013.01); *H04W 88/04* (2013.01); *H04W 88/16* (2013.01); *H04W 88/18* (2013.01)

(56) References Cited

U.S. PATENT DOCUMENTS

| | | | | |
|---|---|---|---|---|
| 2008/0108317 | A1* | 5/2008 | Hsieh .................. | H04B 7/0805 455/232.1 |
| 2014/0241370 | A1* | 8/2014 | Itou ........................ | H04L 45/04 370/396 |

FOREIGN PATENT DOCUMENTS

| | | |
|---|---|---|
| JP | 2011-111039 A | 6/2011 |
| JP | 2014-165746 A | 9/2014 |
| JP | 2015-155259 A | 8/2015 |

OTHER PUBLICATIONS

Office Action issued in corresponding Japanese Patent Application No. 2019-547944 dated May 18, 2021.
Office Action issued in corresponding Indian Patent Application No. 202017014269 dated Jun. 28, 2021.

* cited by examiner

FIG. 3

| DESTINATION OF SWITCH 52 | CONTROL OUTPUT 136 | ACTIVATION SIGNAL DETECTION OUTPUT 111 | SLEEP INPUT 135 | TRANSCEIVER 32 |
|---|---|---|---|---|
| CONTROL OUTPUT 136 | L | Don't care | L | ACTIVATION |
| | H | | H | SLEEP |
| ACTIVATION SIGNAL DETECTION OUTPUT 111 | Don't care | L | H | SLEEP |
| | | H | L | ACTIVATION |

GATEWAY DEVICE

TECHNICAL FIELD

The present invention relates to a gateway device.

BACKGROUND ART

The gateway device is a device that relays communication between networks. In general, when the gateway device is in a sleep state, the networks are connected via a relay switch in the gateway device. When a node belonging to a certain network transmits an activation signal instructing to activate another node, the activation signal is transmitted to another network via the relay switch. Accordingly, the node belonging to another network can be activated without waiting for the gateway device to be activated by the activation signal.

PTL 1 described below describes one example of the gateway device. PTL 1 discloses a problem to be solved that "To provide a data relay device capable of, in response to an activation signal of a network, surely activating a communication node belonging to another network without delay." and a technique that "An activation signal from a first network 10 is received by a first receiver 33, and the received activation signal is given to an input side of a second transmitter 35 through a first interconnect line 37. The activation signal is transmitted to a second network 20 through the second transmitter 35. The transmission is not performed by transmitting an activation signal directly from the first network 10 to the second network 20, but is performed by using a conversion function of the first receiver 33 and the second transmitter 35, thereby preventing distortion and degradation of the activation signal from being generated. As a result, an ECU belonging to the second network 20 is capable of being surely activated by an activation signal from the first network 10 without delay." (see Abstract).

CITATION LIST

Patent Literature

PTL 1: JP 2014-165746 A

SUMMARY OF INVENTION

Technical Problem

In PTL 1 described above, when the gateway device is in a sleep state, the first transceiver, the second transceiver, and the microcomputer operate in a low power consumption mode to reduce power consumption. However, in PTL 1, the microcomputer is always operating even in the low power consumption mode, and thus a certain amount of power is consumed. The demand for suppressing the power consumption of the gateway device in the sleep state is increasing year by year, and it is difficult to satisfy the demand only by operating the microcomputer in the low power consumption mode.

The present invention has been made in view of the above-described problems, and an object of the invention is to provide a gateway device capable of reducing power consumption in a sleep state and relaying an activation signal between networks without delay.

Solution to Problem

When receiving an activation signal, the gateway device according to the present invention transfers the activation signal to another network via a relay switch, and outputs a signal indicating the reception of the activation signal from a transceiver, thereby turning on the power of an arithmetic device.

Advantageous Effects of Invention

According to the gateway device according to the present invention, the activation signal can be relayed to another network without delay by transferring the activation signal via the relay switch. In addition, since the power of the arithmetic device is turned on when the activation signal is received, the power consumption of the arithmetic device can be suppressed.

BRIEF DESCRIPTION OF DRAWINGS

FIG. 3 is a diagram illustrating input/output of a switch 52.

DESCRIPTION OF EMBODIMENTS

First Embodiment

Figure 1:
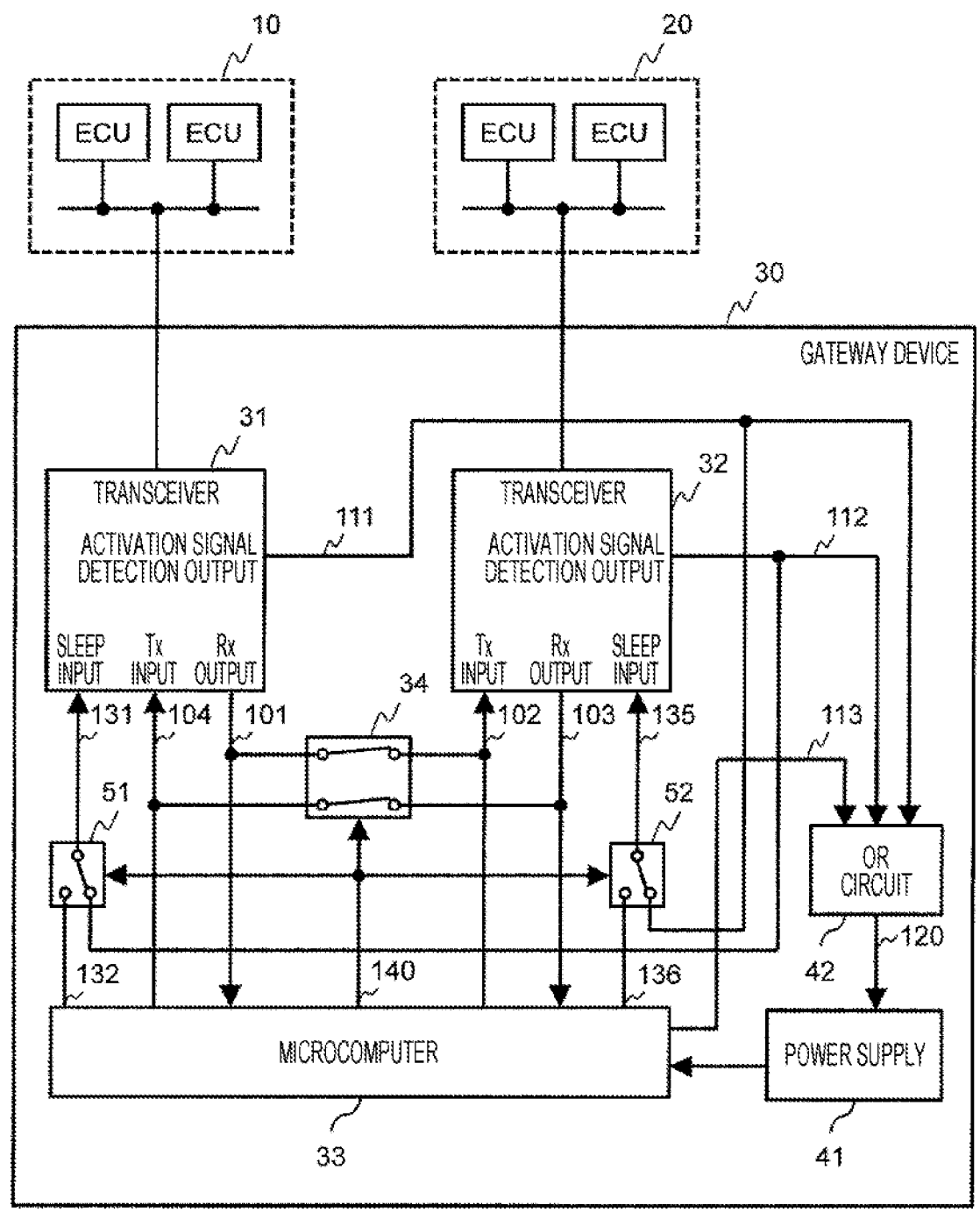
FIG. 1 is a diagram illustrating a configuration example of a gateway device 30 according to a first embodiment.

FIG. 1 is a diagram illustrating a configuration example of a gateway device 30 according to a first embodiment of the present invention. The gateway device 30 is a device that relays communication data between a first network 10 and a second network 20. The gateway device 30 includes a transceiver 31, a transceiver 32, a microcomputer 33, a switch 34, a power supply 41, an OR circuit 42, a switch 51, and a switch 52.

The transceiver 31 is a component for performing CAN communication with an ECU (in-vehicle control device) belonging to the first network 10. The transceiver 31 transmits the data received from the first network 10 from an Rx output 101 to the microcomputer 33, and receives the data transmitted from the microcomputer 33 from a Tx input 104 to transmit the data to the first network 10. The transceiver 31 further includes a sleep input 131 and an activation signal detection output 111. The transceiver 31 shifts to a sleep mode when an H level is input to the sleep input 131, and shifts to a normal mode when an L level is input. When receiving the activation signal from the first network 10, the transceiver 31 outputs a signal indicating the reception from the activation signal detection output 111. The transceiver 31 outputs the L level from the activation signal detection output 111 during the sleep mode.

The transceiver 32 is a component for performing CAN communication with the ECU belonging to the second network 20. The transceiver 32 transmits the data received from the second network 20 from an Rx output 103 to the microcomputer 33, and receives the data transmitted by the microcomputer 33 from a Tx input 102 to transmit the data to the second network 20. The transceiver 32 further includes a sleep input 135 and an activation signal detection output 112. The transceiver 32 shifts to a sleep mode when the H level is input to the sleep input 135, and shifts to a normal mode when the L level is input. When receiving the activation signal from the second network 20, the transceiver 32 outputs a signal indicating the reception from the activation signal detection output 112. The transceiver 32 outputs the L level from the activation signal detection output 112 during the sleep mode.

The microcomputer 33 performs CAN communication with the first network 10 via the transceiver 31 and performs CAN communication with the second network 20 via the transceiver 32. The microcomputer 33 has a control output 132, a control output 136, and a microcomputer output 113. The control output 132 is for putting the transceiver 31 into a sleep state by outputting a signal to the sleep input 131. The control output 136 is for putting the transceiver 32 into a sleep state by outputting a signal to the sleep input 135. The microcomputer output 113 is for turning the power supply 41 on and off. The microcomputer 33 further has a microcomputer output 140. The microcomputer output 140 is for controlling on/off of the switch 34, the switch 51, and the switch 52.

When the switch 34 is turned on, the switch connects the Rx output 101 of the transceiver 31 to the Tx input 102 of the transceiver 32, and connects the Rx output 103 of the transceiver 32 to the Tx input 104 of the transceiver 31. The open/close state of the switch 34 is switched according to the output value of the microcomputer output 140. When the microcomputer output 140 is at the H level, the switch 34 is turned off (open state), and when the microcomputer output 140 is at the L level, the switch 34 is turned on (closed state).

The power supply 41 is a component that supplies power to the microcomputer 33. The power supply 41 switches on/off of a power supply output by an OR circuit output 120 described later. Specifically, the power is turned on when the OR circuit output 120 is at the H level, and the power is turned off when the OR circuit output 120 is at the L level.

The OR circuit 42 performs a logical sum (OR) of the activation signal detection output 111 of the transceiver 31, the activation signal detection output 112 of the transceiver 32, and the microcomputer output 113, and outputs the result as the OR circuit output 120.

The switch 51 is a component for switching the connection destination of the sleep input 131. The switch 51 connects the control output 132 to the sleep input 131 when the microcomputer output 140 is at the H level, and connects the activation signal detection output 112 to the sleep input 131 when the microcomputer output 140 is at the L level.

The switch 52 is a component for switching the connection destination of the sleep input 135. The switch 52 connects the control output 136 to the sleep input 135 when the microcomputer output 140 is at the H level, and connects the activation signal detection output ill to the sleep input 135 when the microcomputer output 140 is at the L level.

Figure 2:
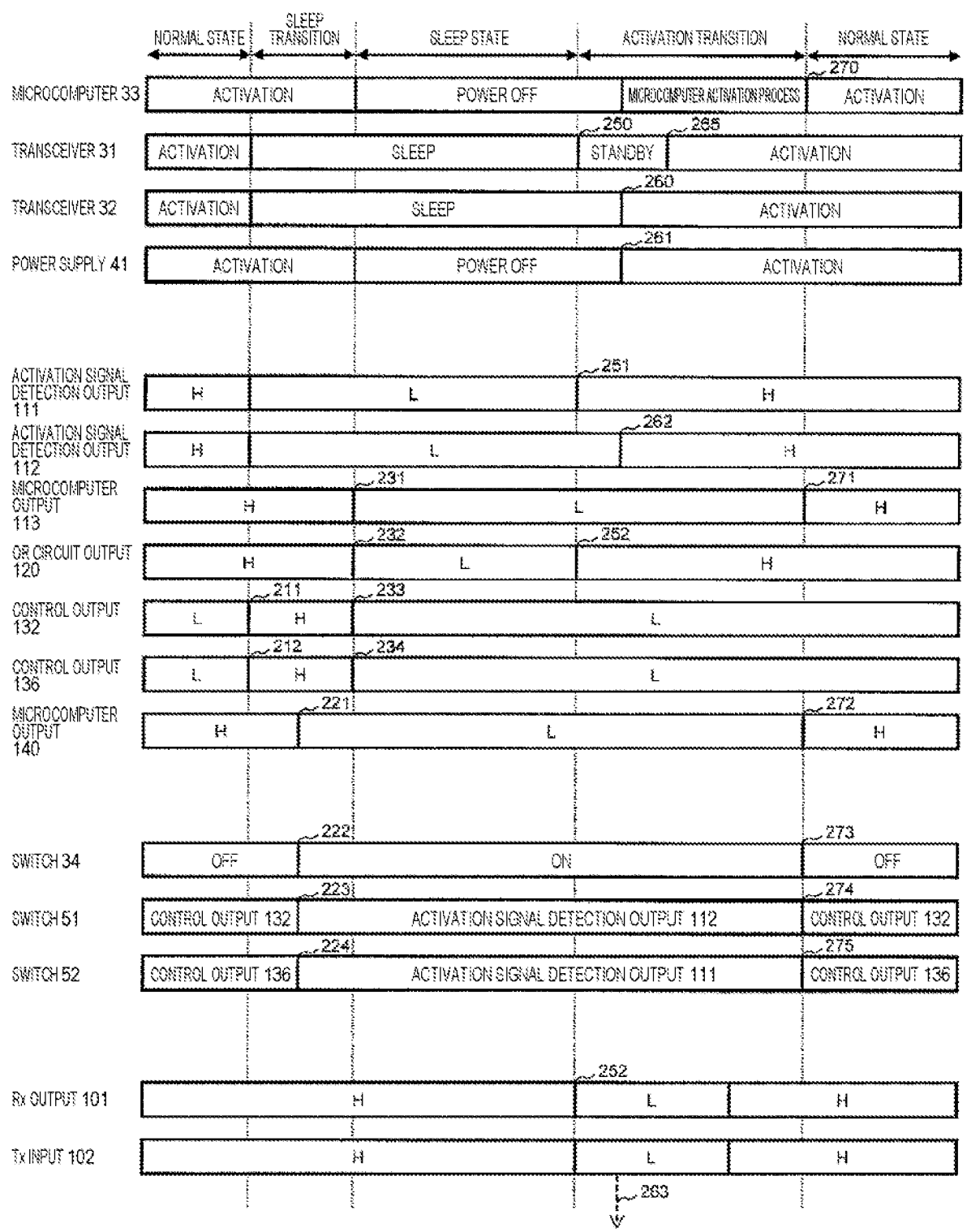
FIG. 2 is a time chart for explaining an operation of the gateway device 30.

FIG. 2 is a time chart for explaining an operation of the gateway device 30. The gateway device 30 has a sleep state as an operation mode for reducing power consumption. In the sleep state, the transceiver 31 and the transceiver 32 are in sleep states, and the power supply 41 and the microcomputer 33 are in power-off states. Hereinafter, the operation of each unit of the gateway device 30 will be described with reference to FIG. 2.

First, the transition from the normal state to the sleep state will be described. The transition to the sleep state is controlled by the microcomputer 33. The microcomputer 33 transitions the transceiver 31 to the sleep state by setting the control output 132 to H (211). Simultaneously, the microcomputer 33 transitions the transceiver 32 to the sleep state by setting the control output 136 to H (212). As a result, the activation signal detection output 111 and the activation signal detection output 112 become L. Next, the microcomputer 33 sets the microcomputer output 140 to L (221) to turn on the switch 34 (222), sets the connection destination of the switch 51 to the activation signal detection output 112 (223), and set the connection destination of the switch 52 to the activation signal detection output 111 (224). Next, the microcomputer 33 sets the microcomputer output 113 to L (231), thereby setting the OR circuit output 120 to L (232). As a result, the power supply 41 is turned off, and the microcomputer 33 is also turned off. When the microcomputer 33 is turned off, the control output 132 becomes L (233), and the control output 136 also becomes L (234). Through the above procedure, the gateway device 30 enters the sleep state.

Next, the transition from the sleep state to the normal state will be described. The transition to the normal state occurs when the transceiver 31 receives an activation signal from the first network 10 or the transceiver 32 receives an activation signal from the second network 20. Here, an example in which the transceiver 31 receives the activation signal from the first network 10 will be described.

When the transceiver 31 receives the activation signal from the first network 10, the transceiver 31 transitions to a standby state (250). As a result, the activation signal detection output 111 of the transceiver 31 is set to H (251), and the Rx output 101 is set to L (252). Since the switch 52 selects the activation signal detection output 111, an activation signal is input to the sleep input 135 of the transceiver 32, and thus, the transceiver 32 is activated (260). After the transceiver 32 is activated, and L (transmission request) is input to the Tx input 102. Thus, the transceiver 32 transmits an activation signal to the second network 20 (263). After the transceiver 32 is activated, H is set to the activation signal detection output 112 (262). Since the switch 51 selects the activation signal detection output 112, an activation signal is input to the sleep input 131 of the transceiver 31, and thus, the transceiver 31 is activated (265). When the activation signal detection output 111 of the transceiver 31 is set to H (251), the OR circuit output 120 also becomes H (252), so that the power supply 41 is also activated (261). The microcomputer 33 is activated after the microcomputer activation process (270), the microcomputer output 113 is set to H (271), and the microcomputer output 140 is set to H (272). As a result, the switch 34 is turned off (273), the connection destination of the switch 51 is set to the control output 132 (274), and the connection destination of the switch 52 is set to the control output 136 (275). Through the above procedure, the gateway device 30 relays the activation signal received from the first network 10 to the second network 20 without delay in the sleep state, and transitions from the sleep state to the normal state.

FIG. 3 is a diagram illustrating input/output of the switch 52. When the switch 52 selects the control output 136, the switch 52 outputs the control output 136 as it is to the sleep input 135. When the switch 52 selects the activation signal detection output 111, the switch 52 inverts the activation signal detection output 111 and outputs the inverted output to the sleep input 135. Thus, the activation signal detection output 111 can be used as a sleep input. The switch 51 performs the same operation.

Figure 4:
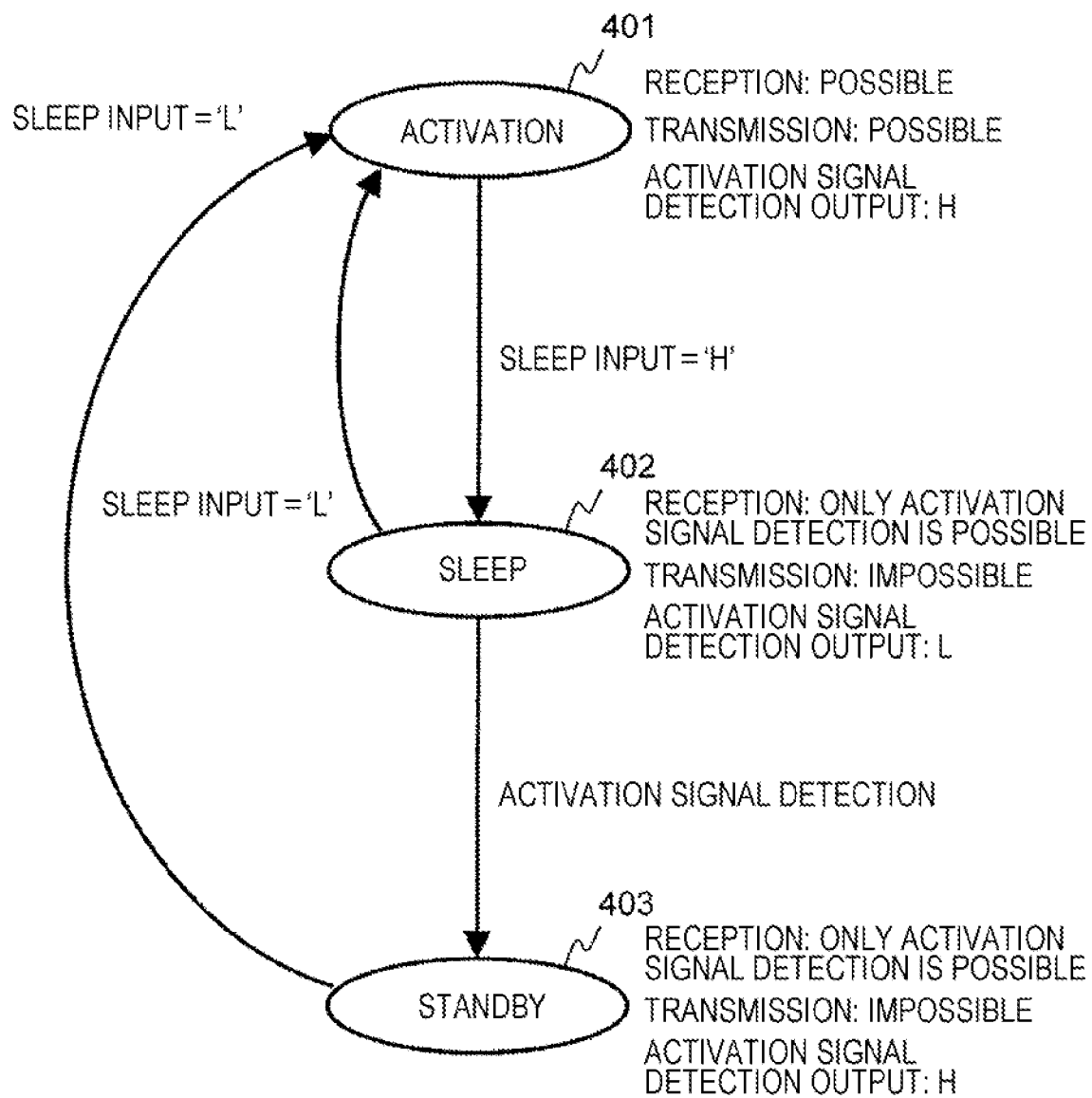
FIG. 4 is a diagram illustrating a state transition of a transceiver 31.

FIG. 4 is a diagram illustrating a state transition of the transceiver 31. Since the state transition of the transceiver 32 is the same, only the state transition of the transceiver 31 will be described below with reference to FIG. 4.

The transceiver 31 has three states of an activation state 401, a sleep state 402, and a standby state 403. The activation state is a state where both transmission and reception are possible, and the transceiver 31 outputs H as the activation signal detection output 111 at this time. The sleep state is a state where only the activation signal can be received, and transmission cannot be performed. At this time, the transceiver 31 outputs L as the activation signal detection output 111. The standby state is a state where only the activation signal can be received, and transmission cannot be performed. At this time, the transceiver 31 outputs H as the activation signal detection output 111. The sleep state 402 and the standby state 403 have lower power consumption than the activation state 401.

When the sleep input 131 becomes H, the transceiver 31 transitions from the activation state 401 to the sleep state 402. When receiving the activation signal from the first network 10, the transceiver 31 transitions from the sleep state 402 to the standby state 403. When the sleep input 131 becomes L, the transceiver 31 transitions from the sleep state 402 to the activation state 401, or transitions from the standby state 403 to the activation state 401.

First Embodiment: Summary

When receiving the activation signal, the gateway device 30 according to the first embodiment transfers the activation signal to another network via the switch 34, and outputs the activation signal detection output 111 or 112 to turn on the power supply 41. Accordingly, the activation signal can be transferred without delay, and the microcomputer 33 can be activated without delay. Therefore, the power consumption of the microcomputer 33 in the sleep mode can be suppressed.

Second Embodiment

Figure 5:
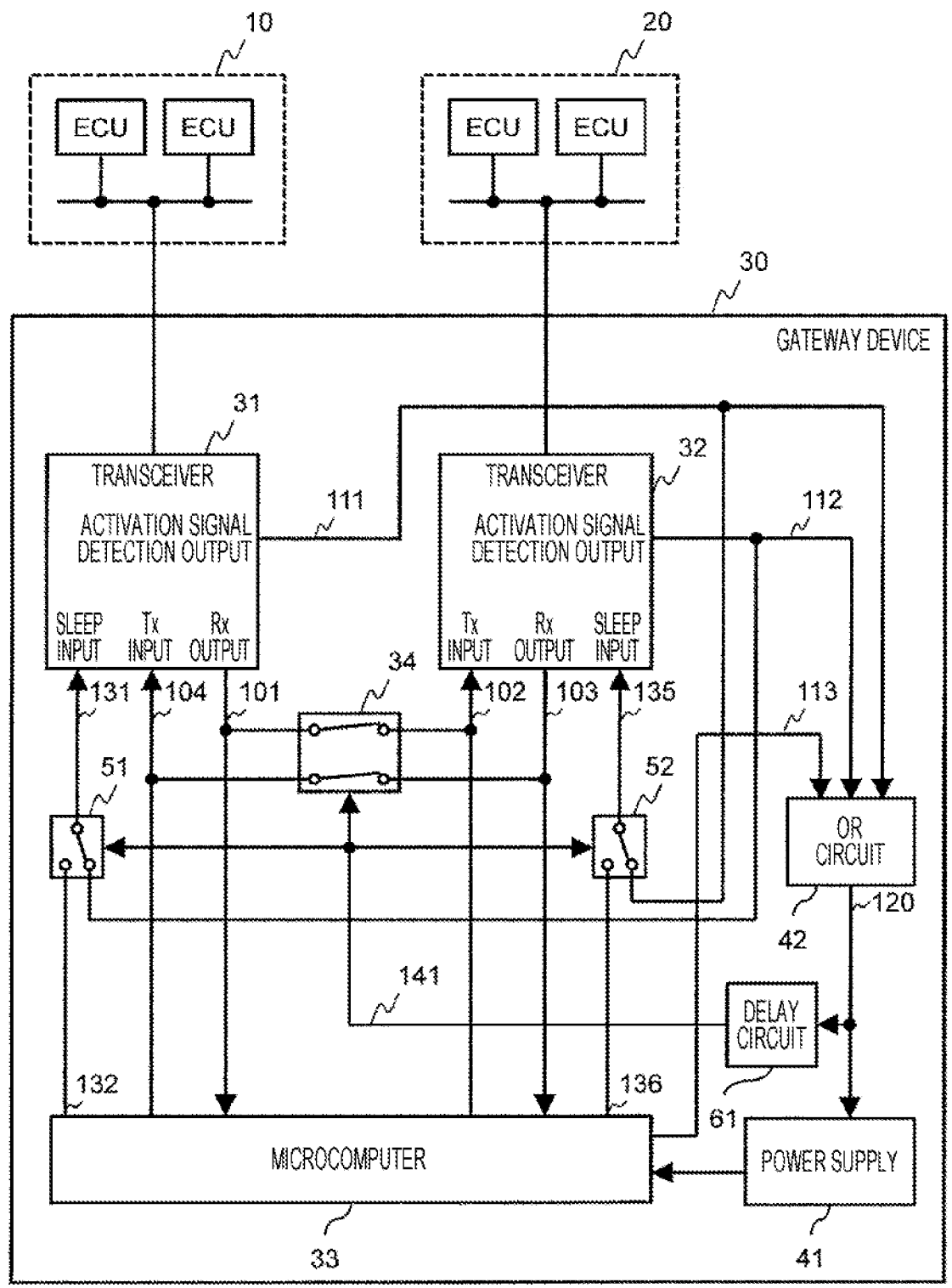
FIG. 5 is a diagram illustrating a configuration example of a gateway device 30 according to a second embodiment.

FIG. 5 is a diagram illustrating a configuration example of the gateway device 30 according to a second embodiment of the present invention. In the second embodiment, a delay circuit 61 is connected to the OR circuit output 120, and the switch 34, the switch 51, and the switch 52 are opened/closed by the delay circuit output 141. Therefore, the microcomputer 33 does not control these switches. Other configurations are the same as those of the first embodiment, and therefore, the differences will be mainly described below.

When the input signal changes from L to H, the delay circuit 61 changes the output signal to H after holding the output signal for a predetermined delay time L. When the input signal changes from H to L, the output signal changes from H to L without adding a delay time. The specific delay time will be described later.

Figure 6:
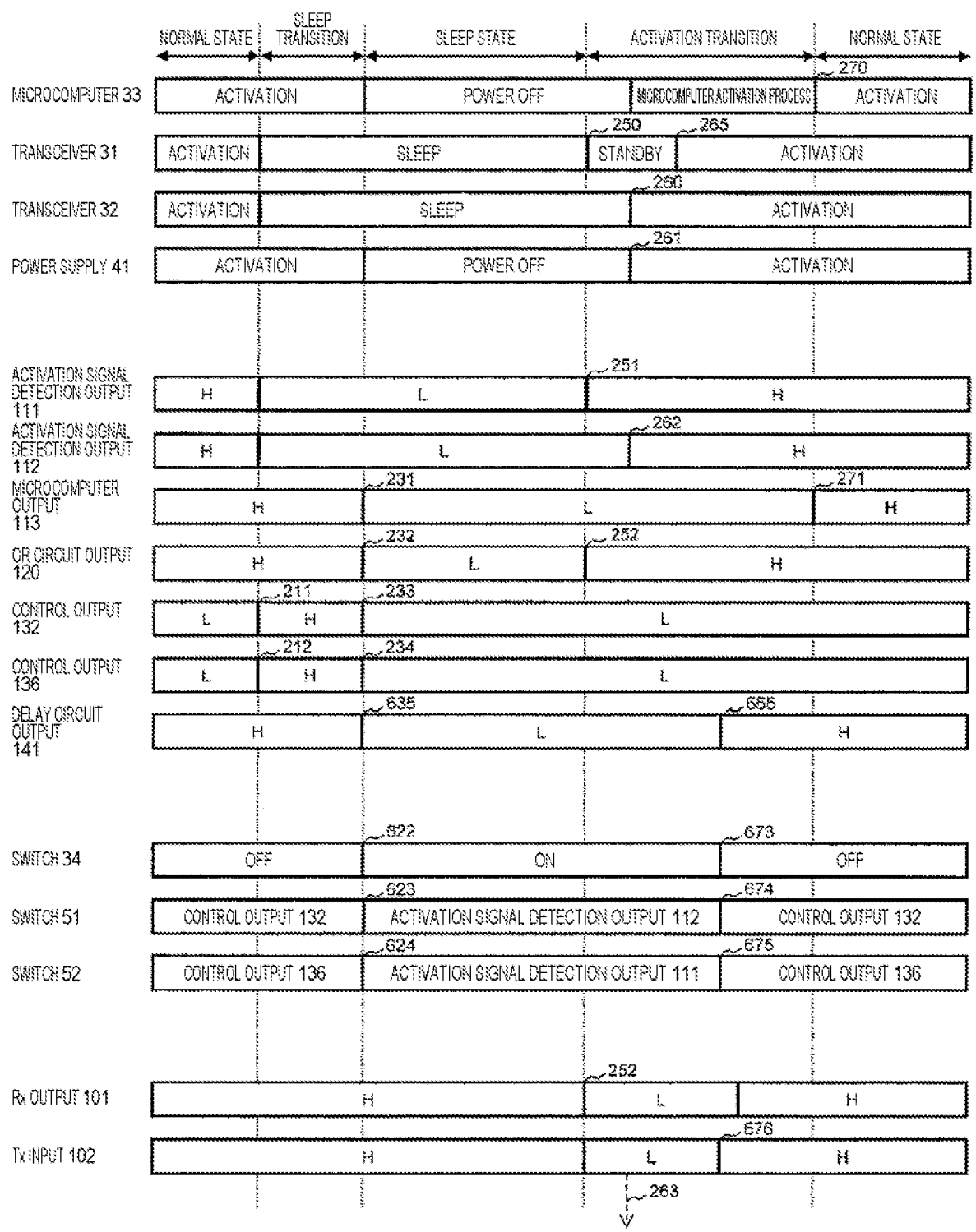
FIG. 6 is a time chart for explaining an operation of the gateway device 30 according to the second embodiment.

FIG. 6 is a time chart for explaining an operation of the gateway device 30 according to the second embodiment. The operation mode of the gateway device 30 and each transceiver is the same as in the first embodiment. Hereinafter, the operation of each unit in the second embodiment will be described with reference to FIG. 6.

First, the transition from the normal state to the sleep state will be described. The transition to the sleep state is controlled by the microcomputer 33. The microcomputer 33 transitions the transceiver 31 to the sleep state by setting the control output 132 to H (211). Simultaneously, the microcomputer 33 transitions the transceiver 32 to the sleep state by setting the control output 136 to H (212). As a result, the activation signal detection output 111 and the activation signal detection output 112 become L. Next, the microcomputer 33 sets the microcomputer output 113 to L (231), thereby setting the OR circuit output 120 to L (232). As a result, the power supply 41 is turned off, and the microcomputer 33 is also turned off. When the microcomputer 33 is turned off, the control output 132 becomes L (233), and the control output 136 also becomes L (234). At the same time as the OR circuit output 120 becomes L, the delay circuit output 141 also becomes L (635). As a result, the switch 34 is set to be turned on (622), the connection destination of the switch 51 is set to the activation signal detection output 112 (623), and the connection destination of the switch 52 is set to the activation signal detection output 111 (624). Through the above procedure, the gateway device 60 enters the sleep state.

Next, the transition from the sleep state to the normal state will be described. As in FIG. 2, an example will be described in which the transceiver 31 transitions to the normal state by receiving an activation signal from the first network 10.

When the transceiver 31 receives the activation signal from the first network 10, the transceiver 31 transitions to a standby state (250). As a result, the activation signal detection output 111 of the transceiver 31 is set to H (251), and the Rx output 101 is set to L (252). Since the switch 52 selects the activation signal detection output 111, an activation request is input to the sleep input 135 of the transceiver 32, and thus, the transceiver 32 is activated (260). After the transceiver 32 is activated, and L (transmission request) is input to the Tx input 102. Thus, the transceiver 32 transmits an activation signal to the second network 20 (263). After the transceiver 32 is activated, H is set to the activation signal detection output 112 (262). Since the switch 51 selects the activation signal detection output 112, an activation request is input to the sleep input 131 of the transceiver 31, and thus, the transceiver 31 is activated (265). When the activation signal detection output 111 of the transceiver 31 is set to H (251), the OR circuit output 120 also becomes H (252), so that the power supply 41 is also activated (261). The delay circuit output 141 becomes H (665) after a predetermined delay time after the OR circuit output becomes H (252). As a result, the switch 34 is set to be turned off (673), the connection destination of the switch 51 is set to the control output 132 (674), and the connection destination of the switch 52 is set to the control output 136 (675). The microcomputer 33 is activated after the microcomputer activation process (270), and sets the microcomputer output 113 to H (271). Through the above procedure, the gateway device 30 relays the activation signal received from the first network 10 to the second network 20 without delay in the sleep state, and transitions from the sleep state to the normal state.

Second Embodiment: Summary

The gateway device 30 according to the second embodiment switches the switches 34, 51, and 52 by the delay circuit output 141 after the delay time given by the delay circuit 61 after the power supply 41 is turned on. Thus, even if the microcomputer 33 does not control these switches, the same effect as in the first embodiment can be exhibited.

In the second embodiment, the delay time of the delay circuit 61 can be set as follows. When the transceiver 31 or 32 receives the activation signal, the transceiver sets the Rx output to the L level, whereby the activation signal is output to the switch 34. At the same time, the OR circuit output 120 becomes the H level. The switch 34 needs to be on until the transceiver receiving the activation signal finishes sending the activation signal to another transceiver. Therefore, the delay time needs to be at least greater than or equal to the time taken for the transceiver to shift to a standby mode and finish sending the activation signal.

Third Embodiment

Figure 7:
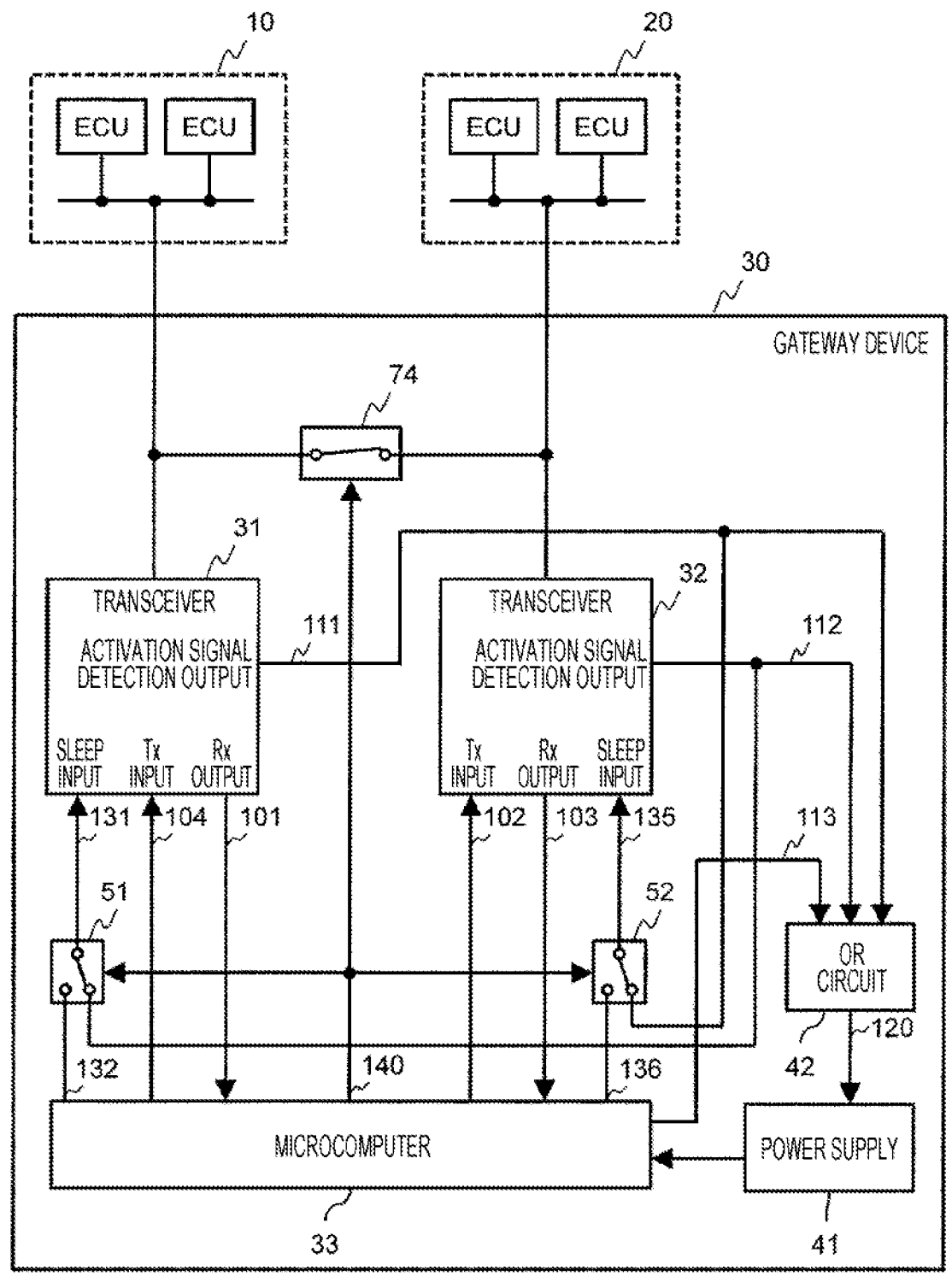
FIG. 7 is a diagram illustrating a configuration example of the gateway device 30 according to a third embodiment.

FIG. 7 is a diagram illustrating a configuration example of the gateway device 30 according to a third embodiment of the present invention. In the third embodiment, a switch 74 is provided instead of the switch 34. The switch 74 is arranged at a position that bypasses a signal line connecting between the first network 10 and the transceiver 31 and a signal line connecting between the second network 20 and the transceiver 32. Other configurations are the same as those of the first embodiment, and therefore, the differences will be mainly described below.

The operation procedure of the gateway device 30 according to the third embodiment is the same as the time chart described in FIG. 2. Also in the third embodiment, the same effect as in the first embodiment can be exhibited.

In the third embodiment, there is a concern that transmission errors are likely to occur when the number of ECUs belonging to the first network 10 and the second network 20 increases. However, the configuration of the third embodiment is also effective as long as the configuration is a network configuration in which the number of ECUs is small, and the occurrence of the transmission errors falls within an allowable value.

Modification of Invention

Incidentally, the present invention is not limited to the above-described embodiments, and various modifications are included. For example, the above-described embodiments have been described in detail for easy understanding of the invention and are not necessarily limited to those having all the described configurations. In addition, a part of the configuration of a certain embodiment can be replaced with the configuration of another embodiment, and the configuration of another embodiment can be added to the configuration of a certain embodiment. Further, it is possible to add, delete, and replace other configurations for a part of the configuration of each embodiment.

In the above embodiment, the example in which the CAN communication is relayed has been described. However, the present invention is not limited to the CAN communication, and the present invention can be applied to the case where other protocols are relayed. Further, the present invention is not limited to the vehicle-mounted network, but can be applied to general communication networks.

REFERENCE SIGNS LIST 10 first network
20 second network
30 gateway device
31 transceiver
32 transceiver
33 microcomputer
34 switch
41 power supply
42 OR circuit
51 switch
52 switch
61 delay circuit
74 switch

The invention claimed is:

1. A gateway device that relays communication between a first network and a second network, the device comprising:
a first transceiver that transmits and receives signals to and from the first network;
a second transceiver that transmits and receives signals to and from the second network;
a relay switch that relays communication;
an arithmetic device that relays communication between the first network and the second network via the first transceiver and the second transceiver; and
a power supply circuit that supplies power to the arithmetic device, wherein
both the first transceiver and the second transceiver are configured to be able to switch between a first mode for transmitting and receiving signals and a second mode having lower power consumption than the first mode,
when an instruction is output to switch the first transceiver and the second transceiver from the first mode to the second mode, the arithmetic device outputs the instruction and turns off the power supply circuit to block power supply to the arithmetic device,
the first transceiver, when operating in the second mode, is configured to be able to receive an activation instruction signal instructing to activate the gateway device from the first network and shift to the first mode,
the second transceiver, when operating in the second mode, is configured to be able to receive the activation instruction signal from the second network and shift to the first mode,
when the first transceiver and the second transceiver operate in the second mode, the gateway device turns on the relay switch to relay the activation instruction signal between the first network and the second network without interposing the arithmetic device,
the first transceiver, when receiving the activation instruction signal, is configured to output a first activation instruction detection signal indicating the reception to the second transceiver,
the second transceiver, when receiving the activation instruction signal, is configured to output a second activation instruction detection signal indicating the reception to the first transceiver,
the power supply circuit is configured to supply power to the arithmetic device according to at least one of a case where the first transceiver outputs the first activation instruction detection signal or a case where the second transceiver outputs the second activation instruction detection signal, and
a delay circuit configured to turn off the relay switch after a delay of a predetermined delay time with at least one of a time when the first transceiver outputs the first activation instruction detection signal or a time when the second transceiver outputs the second activation instruction detection signal as a starting point,
wherein the delay time is set to be equal to or longer than at least a time from when the first transceiver shifts from the second mode to the first mode to when the first transceiver finishes relaying the activation instruction signal to the second transceiver through the relay switch, and
wherein the delay time is set to be equal to or longer than at least a time from when the second transceiver shifts from the second mode to the first mode to when the second transceiver finishes relaying the activation instruction signal to the first transceiver through the relay switch.

2. The gateway device according to claim 1, further comprising:
an OR circuit, wherein
the OR circuit is configured to output a signal instructing that the power supply circuit supplies power to the arithmetic device while receiving at least one of the first activation instruction detection signal, the second activation instruction detection signal, and a signal output by the arithmetic device and indicating that the arithmetic device is operating, and
when switching the first transceiver and the second transceiver from the first mode to the second mode, the arithmetic device outputs a signal indicating the switch to the first transceiver and the second transceiver and outputs a signal indicating that the arithmetic device is not operating to the OR circuit.

3. The gateway device according to claim 1, wherein
the first transceiver includes a first sleep input terminal that receives a signal instructing the first transceiver to switch between operations in the first mode and the second mode, and
the second transceiver includes a second sleep input terminal that receives a signal instructing the second transceiver to switch between the operations in the first mode and the second mode,
the gateway device further comprising:
a first switch that switches a signal input to the first sleep input terminal between the first activation instruction detection signal and a signal output by the arithmetic device; and
a second switch that switches a signal input to the second sleep input terminal between the second activation instruction detection signal and a signal output by the arithmetic device, wherein
when the first transceiver and the second transceiver shift to the second mode, the arithmetic device outputs a sleep signal indicating the shift via the first sleep input terminal and the second sleep input terminal, and
after outputting the sleep signal, the arithmetic device switches the first switch so that the second activation instruction detection signal is input to the first sleep input terminal, and switches the second switch so that the first activation instruction detection signal is input to the second sleep input terminal.

4. The gateway device according to claim 1, wherein
the first transceiver includes a first sleep input terminal that receives a signal instructing the first transceiver to switch between operations in the first mode and the second mode, and
the second transceiver includes a second sleep input terminal that receives a signal instructing the second transceiver to switch between the operations in the first mode and the second mode,
the gateway device further comprising:
a first switch that switches a signal input to the first sleep input terminal between the first activation instruction detection signal and a signal output by the arithmetic device; and
a second switch that switches a signal input to the second sleep input terminal between the second activation instruction detection signal and a signal output by the arithmetic device, wherein
when the arithmetic device is activated by receiving power from the power supply circuit, the arithmetic device switches the first switch so as to input a signal output by the arithmetic device to the first sleep input terminal, and switches the second switch so as to input a signal output by the arithmetic device to the second sleep input terminal.

5. The gateway device according to claim 1, wherein
the arithmetic device turns off the relay switch while receiving power supply from the power supply circuit.

6. The gateway device according to claim 1, wherein
the relay switch is arranged at a position bypassing between a signal line connecting the first network and the first transceiver and a signal line connecting the second network and the second transceiver,
when the first transceiver and the second transceiver operate in the second mode, the gateway device relays communication between the first network and the second network without interposing the first transceiver, the second transceiver, and the arithmetic device by turning on the relay switch, and
when the first transceiver and the second transceiver operate in the first mode, the gateway device relays communication between the first network and the second network through the first transceiver, the second transceiver, and the arithmetic device by turning off the relay switch.

* * * * *